US007797742B2

(12) United States Patent
Sheldon et al.

(10) Patent No.: US 7,797,742 B2
(45) Date of Patent: Sep. 14, 2010

(54) FILE BLOCKING MITIGATION (75) Inventors: Elizabeth Jeanne Sheldon, Woodinville, WA (US); Ambrose T. Treacy, Woodinville, WA (US); Maithili V. Dandige, Sammamish, WA (US); Walter D. Pullen, Seattle, WA (US); Bikramjit S. Kalra, Seattle, WA (US); Jonathan B. Bailor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 11/679,048

(22) Filed: Feb. 26, 2007

(65) Prior Publication Data
US 2008/0209138 A1    Aug. 28, 2008

(51) Int. Cl.
G06F 11/00    (2006.01)
H04L 9/00    (2006.01)

(52) U.S. Cl. .............................. 726/22; 726/23; 726/24; 726/25; 726/26; 726/27; 713/187; 713/188

(58) Field of Classification Search ..................... 726/22
See application file for complete search history.

(56) References Cited

U.S. PATENT DOCUMENTS

| 5,058,000 | A | 10/1991 | Cox et al. |
| 5,191,525 | A | 3/1993 | LeBrun |
| 5,278,978 | A | 1/1994 | Demers |
| 5,493,671 | A | 2/1996 | Pitt |
| 5,793,498 | A | 8/1998 | Scholl |
| 6,336,124 | B1 | 1/2002 | Alam et al. |
| 6,453,418 | B1 | 9/2002 | Ooki |
| 6,523,172 | B1 | 2/2003 | Martinez-Guerra |
| 6,675,373 | B1 | 1/2004 | Croslin |
| 6,778,668 | B1 | 8/2004 | Nielsen |
| 6,901,519 | B1 | 5/2005 | Stewart et al. |
| 7,017,187 | B1 | 3/2006 | Marshall |
| 7,043,634 | B2 | 5/2006 | Wolff |
| 2003/0088680 | A1 | 5/2003 | Nachenberg |
| 2004/0172551 | A1 | 9/2004 | Fielding |

(Continued)

FOREIGN PATENT DOCUMENTS

JP    2005/157898    6/2005

(Continued)

OTHER PUBLICATIONS

PCT Search Report and Written Opinion for International Application No. PCT/US2008/053360, dated Jun. 27, 2008, 10 pgs.

(Continued)

*Primary Examiner*—Longbit Chai
(74) *Attorney, Agent, or Firm*—Merchant & Gould P.C.

(57) ABSTRACT

Embodiments are described for blocking the opening of a file. Some embodiments include receiving a request to open a file. In response, a portion of the file's data is examined to determine a true file format for the file. A determination is then made as to whether the true file format of the file has been set as blocked. Based on the determination that the file format is blocked from opening, the file is prevented from being loaded into memory and from being accessed. A message is then displayed to a user indicating that the file has been blocked from opening.

17 Claims, 7 Drawing Sheets

U.S. PATENT DOCUMENTS

| | | |
|---|---|---|
| 2004/0179220 A1 | 9/2004 | Van Oosterhout |
| 2005/0039082 A1 | 2/2005 | Nachenberg |
| 2005/0235164 A1 | 10/2005 | Gassoway |
| 2006/0010495 A1 | 1/2006 | Cohen |

FOREIGN PATENT DOCUMENTS

| | | |
|---|---|---|
| WO | WO2006/038987 | 4/2006 |
| WO | WO2006043233 | 4/2006 |

OTHER PUBLICATIONS

Diaz, Luis Martin, et al., "Inter-organizational Document Exchange—Facing the Conversion Problem with XML," http://www.is.tu-darmstadt.de.download/inter-organizational_document_exchange.pdf, Copyright 2002, 5 pages.

Muller, Uwe, et al., "Scope—An XML Based Publishing Platform;" http://adt.cal.edu.au/ed2005/papers/110Bishop.pdf, Copyright 2005, 8 pages.

Bartlett, P.G., "Epic: Single Source Publishing with XML," http://www.ideamance.org/papers/xm102/dx_xm102/papers/04-06-03/04-06-03.pdf, XML 2002 Proceedings by deepX, 2 pages.

Virk, Rizwan, "Why Use XML for Documents and Content?", http://www.datawarehouse.com/iknowledge/whitepapers/CID3443.pdf, Copyright 2002, CambridgeDocs, LLC—Version 1.2, 6 pages.

Cisco, ASA 5500 Series Adaptive Security Appliances; http://www.cisco.com/application.pdf/en/us/guest/products/ps6120/c1031/cdccont_0900aecd80285492.pdf, Copyright /2006, 2 pages.

Host and Network Intrusion Prevention, http://www.mcafee.com/us/local_content/white_papers/wp_host_nip.pdf, Feb. 2005, 11 pages.

Grace, Tim, et al., NIST Special Publication 800-61, "Computer Security Incident Handling Guide," http://www.csrc.nist.gov/publicatoins/nistpubs/800-61/sp800-61.pdf, Jan. 2004, 148 pages.

FILE BLOCKING MITIGATION

BACKGROUND

Dealing with malicious code such as viruses and Trojan horses is a constant concern for software developers. Hackers are becoming faster at taking advantage of a vulnerability within an application as soon as the vulnerability becomes known. Malicious code that takes advantage of a known vulnerability on the same day that the vulnerability becomes generally known is referred to as a zero day exploit. To date, there are very few solutions that effectively deal with zero day exploits.

Because of the speed with which the malicious code can be circulated in a zero day exploit, developers do not have enough time to implement a patch or other solution to deal with the vulnerability. Frequently, the only solution available is to reduce the potential for opening malicious code by encouraging users to follow security best practices such as turning off unneeded services, keeping patch levels up to date, and avoid opening attachments that are from unknown sources or are unexpected. However, these precautions are not always effective in preventing malicious code from circulating and being executed during a zero day exploit.

It is with respect to these and other considerations that embodiments of the present invention have been made. Also, although relatively specific problems have been discussed, it should be understood that embodiments of the present invention should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Described are embodiments directed to preventing a user from opening or saving a file that is in a format that may contain a security vulnerability. These embodiments are useful in mitigating damage that occurs during a zero day exploit in which on the same day the vulnerability becomes known it is exploited to circulate malicious code. In the embodiments, an open or save block policy may be set for an application, where the block policy indicates which file formats are blocked from being opened or saved by the application. During a zero day exploit, a block policy can be set to prevent an application from opening or saving a file of a format that is known to contain a vulnerability. When a user requests to open or save a file, the true file format of the file is determined and is compared to the block policy and a decision is made as to whether the file should be blocked from being opened or saved.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

As briefly described above, embodiments are directed to preventing a user from opening or saving a file that is of a format known to contain a security vulnerability. An open or save block policy is set for an application, where the block policy indicates which file formats are blocked from being opened or saved by the application. In embodiments, the block policy is an overriding policy that can only be set by an administrator and cannot be changed by a user. During a zero day exploit, an administrator can set the block policy to prevent an application from opening or saving a file of a specific file format that is known to contain the security vulnerability. When a user requests to open or save a file, the true file format of the file is determined and compared with the block policy and a decision is made as to whether the file is of a format that is blocked from opening or saving.

Figure 1:
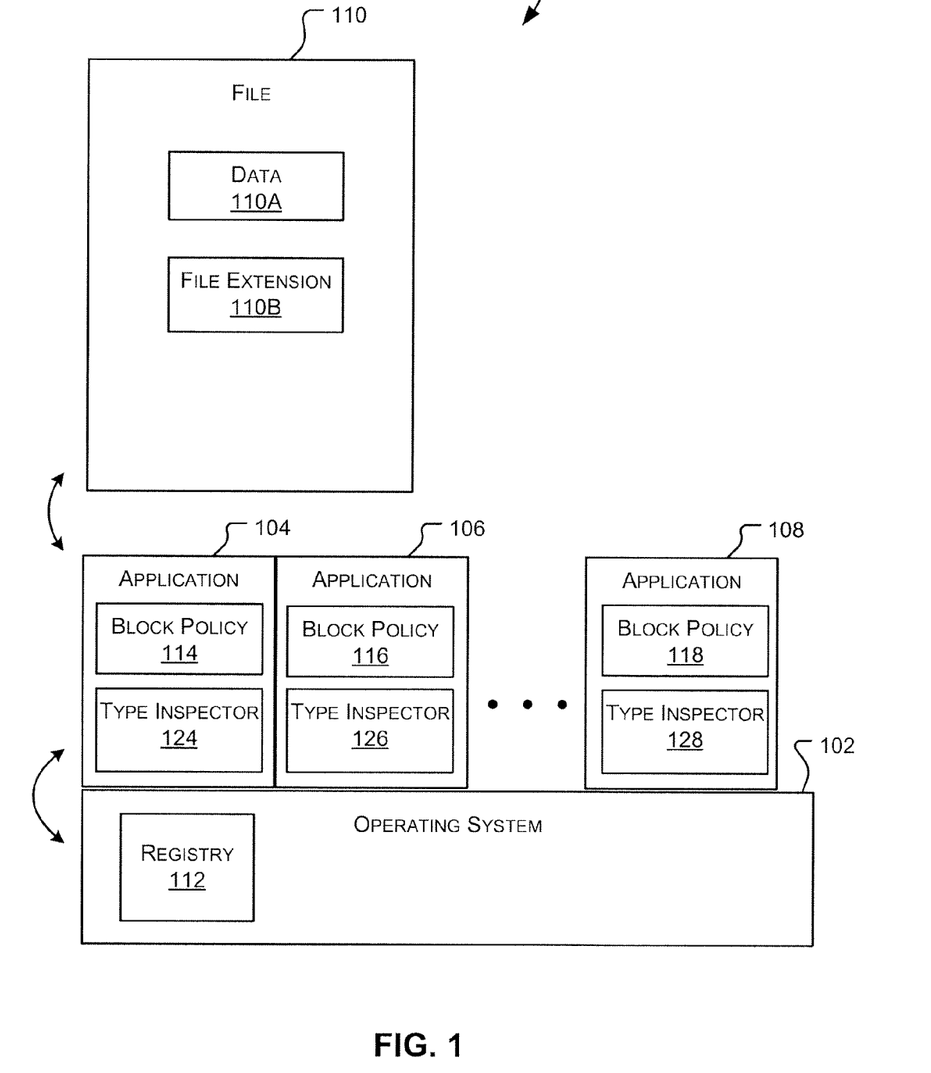
FIG. 1 illustrates a system that can be used to block the opening of a file.

FIG. 1 illustrates a system 100 that can block the opening or saving of a file, according to one embodiment. In this embodiment, system 100 includes an operating system 102 with registry 112, applications 104, 106, and 108, and a file 110. File 110 includes data 110A and a file extension 110B (e.g., as part of the file name). Further, in accordance with this embodiment, applications 104, 106, and 108 each include a block policy (114, 116, and 118). The block policies 114, 116, and 118 in some embodiments indicate which types of files are blocked from being opened by applications 104, 106, and 108. In addition, the block policies 114, 116, and 118 can also indicate which file types are blocked from being saved. Block policies are described in greater detail below.

In operation, applications 104, 106, and 108 can communicate with operating system 102 for purposes such as, for example, accessing operating system functions. In addition, applications 104, 106, and 108 can open, edit, save, and/or create files. In the embodiment shown in FIG. 1, application 104 is interacting with file 110. As one example, application 104 may be a word processing application. A user can launch application 104 and then open a file (e.g., file 110) with application 104, which loads file 110 into memory and provides access to the file. The user can then add and edit data (i.e., data 110A) in file 110. Applications 104, 106, and 108 are not limited to a specific type of application, but may be any kind of application, such as word processing, spreadsheet, graphic presentation etc.

Application 104, in embodiments, also sets file extension 110B to indicate that file 110 is of a particular type. For example, in this embodiment file extension 110B is part of the file name of file 110 assigned to the file when the file is "saved" or "saved-as." For example, a word processing application can cause a file (e.g., a text document) to have a file extension of ".doc" to indicate that the file is of a binary file format.

File extensions, such as 110B, are sometimes used by administrators for detecting or blocking potentially malicious files (i.e., files with a known vulnerability that can be exploited to introduce malicious code) before they are received by a network. For example, an email server can be configured to detect and block all email with files having a particular file extension, while allowing email with files having other file extensions to enter the email client network. However, because file extensions can be easily manipulated by simply renaming a file with a different extension, the use of file extensions is not a trustworthy mechanism for identifying files with malicious code from being introduced into a network. Moreover, blocking a file before it enters a network prevents a user, who is expecting the file, from knowing that the file was blocked and/or that there is a security issue with the file.

In the embodiment shown in FIG. 1, applications 104, 106, and 108 include type inspector modules 124, 126, and 128. Type inspector modules 124, 126, and 128 examine file data (e.g., 110A) and determine a true file format of a file. The term "true file format" is used in this application to describe the actual format of a file. As one example, a word processing document may have a file format of *.doc; *.dot; or *.wiz. It should be understood that in the embodiment shown in FIG. 1, the true file format of a file is not determined by inspecting a file extension such as extension 110B. Rather, type inspector modules 124, 126, and 128 examine a portion of file data e.g., 110A, and based on the examination determine the true file format of a file.

In one embodiment, type inspector modules 124, 126, and 128 read the first few bytes of data from a file (i.e., sniff the file), and based on such features as header information and data structures within the examined data, the type inspector modules can determine a file's true file format. A true file format is described in the present application using a file extension. For example, a file format may be described as *.doc; *.dot; and/or *.wiz. However, describing a true file format as a file extension should not be confused with determining a true file format, which does not involve examining the file extension. As described in greater detail below, a number of file formats can be grouped into a true file type for efficiently setting block policy for an application.

In operation, system 100 first launches an application, such as application 104. The launching of application 104 may occur by a user requesting the launch of application 104, for example by double-clicking on an icon representing application 104. Alternatively, a user may request that file 110, be opened by for example double-clicking on an icon of the file 110. In this case operating system 102 may associate file extension 110B with application 104 and initiate the launch of application 104.

Application 104 loads configuration information when launched. In some embodiments the configuration information is stored in a registry 112 of operating system 102. In these embodiments, when application 104 launches, it will request the configuration information from operating system 102, which will retrieve the information from registry 112. In one embodiment, block policy 114 is stored as configuration information within the registry of operating system 102; for example in the form of registry keys. Accordingly, when application 104 launches, it will retrieve block policy 114 from registry 112.

In some embodiments, access to block policy 114 is limited to those users with the privilege to access registry 112, for example users with administrative privileges. Therefore, an administrator can effectively control the file formats that are blocked from being opened or saved using application 104. In some embodiments, the block policies for all of the applications 104, 106, and 108 are stored within registry 112. This allows an administrator to effectively control which file formats are opened or saved using any application. In other embodiments, block policy 114 is set by a user within application 104.

Once launched, application 104 can be used to open, edit, and save files. As a first example, when application 104 attempts to open file 110, type inspector module 124 first examines a portion of data 110A to determine a true file format of file 110. As described above, in an embodiment type inspector module 124 determines the true file format by examining the first few bytes of data 110A. Type inspector module 124 may use header information or data structures within data 110A to make the determination as to the true file format of file 110. Once the true file format of file 110 has been determined, application 104 compares the true file format to block policy 114. If the true file format of file 110 is not identified by block policy 104A as blocked from being opened, application 104 will open file 110 by loading the file into memory and providing file access to a user to add, edit, and save data in file 110.

As another example, a user may request application 104 to save file 110, such as when closing the file 110, or saving changes that have been made to data 110A. In embodiments, application 104 allows a user to select a specific file format for saving file 110. In response to the request by a user to save file 110, application 104 will compare the file format selected by the user to block policy 114 to determine whether the file format selected by the user is blocked for saving. If the file format selected by the user is not identified by block policy 114 as blocked from being saved, application 104 will save file 110 in the file format selected by the user.

Figure 2:
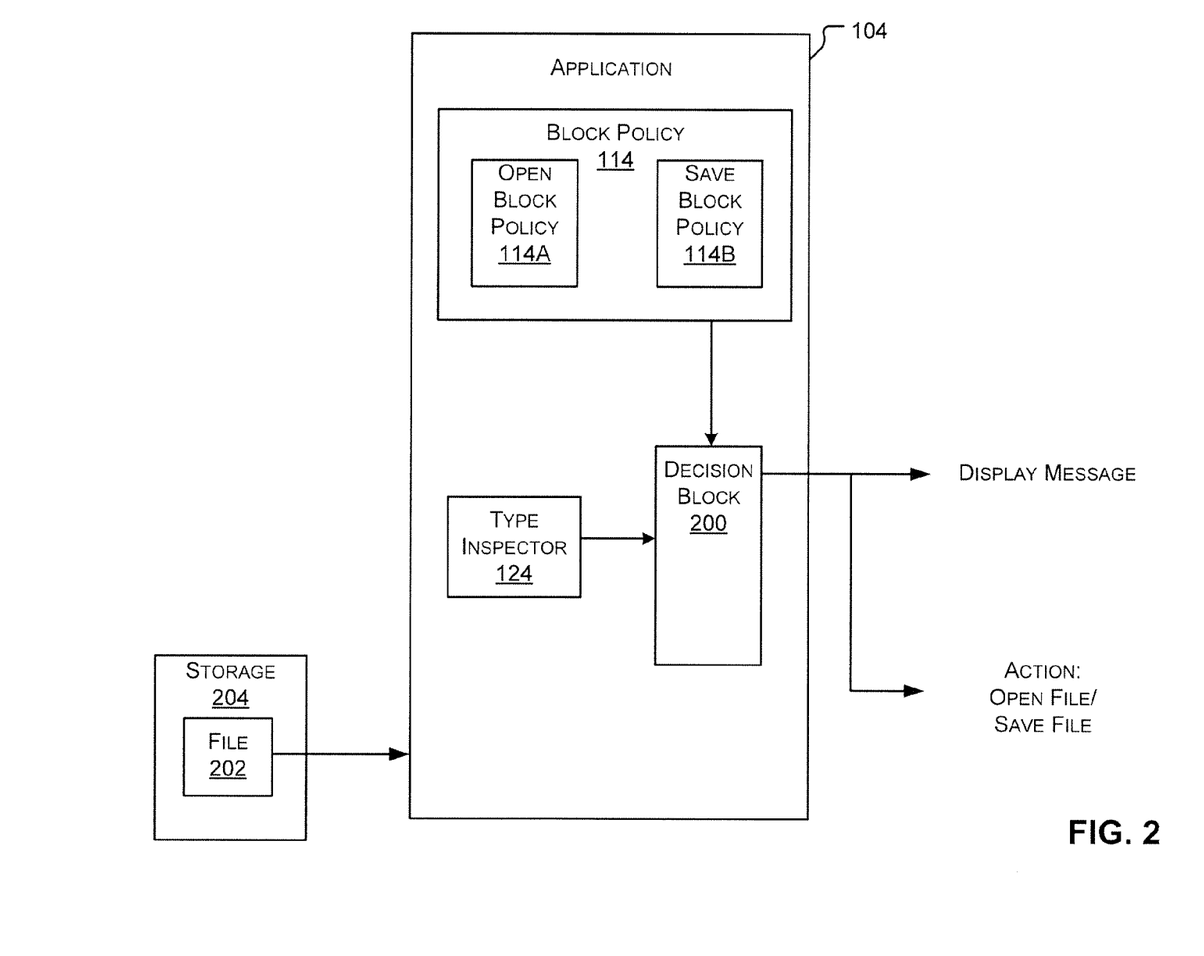
FIG. 2 illustrates an application depicted in FIG. 1 that may be blocked from opening a file.

FIG. 2 illustrates a more detailed embodiment of application 104 (FIG. 1). In this embodiment, application 104 includes type inspector module 124; block policy 114, which includes open block policy 114A and save block policy 114B; and a decision block 200. A user may request application 104 to open file 202, by loading file 202 into memory from storage 204 and providing access to file data in file 202 through application 104.

As shown in FIG. 2, block policy 114 includes open block policy 114A and save block policy 114B. Open block policy 114A indicates which file formats are blocked from being opened by application 104. Save block policy 114B indicates which file formats are blocked from being saved by application 104. In one embodiment, block policies 114A and 114B group a number of file formats into a file type. The file types provide a convenient way of grouping a number of file formats that are similar, and are likely to have similar vulnerabilities. In this way, if a particular file format has a vulnerability that is being exploited during a zero day exploit, a block policy can be set based on the file type, which would prevent the vulnerable file format, and similar file formats (which likely suffer from the same vulnerability), from being opened or saved.

Table 1 illustrates one example of grouping a number of file formats into file types. As shown in Table 1, each file type is associated with a number of formats. For example, the file type OpenXmlFiles is associated with the formats *.docx, *.dotx, *.docm, *.dotm, *.xml. Accordingly, in one embodiment a block policy may be set to block the opening of all files that are of the file type OpenXmlFiles, which would prevent the opening of files with the formats *.docx, *.dotx, *.docm, *.dotm, *.xml. Also shown in Table 1 is an XmlFiles type that is associated only with *.xml format. This illustrates the flexibility provided by allowing an administrator to create different file types associated with a variety of formats. In some situations, a vulnerability may be limited to a very specific format in which case an administrator can set a block policy that identifies a file type associated with the single file format. In other situations, a vulnerability may relate to several formats and a block policy that uses a file type that encompasses a number of formats is more appropriate. As those of skill in the art will appreciate, file types may be created for any combination of file formats.

TABLE 1

Example of File Type Groups

| File Type | Format |
|---|---|
| OpenXmlFiles | *.docx, *.dotx, *.docm, *.dotm, *.xml |
| BinaryFiles | *.doc, *.dot |
| HtmlFiles | *.htm, *.html, *.mht, *.mhtml |
| XmlFiles | *.xml |
| RtfFiles | *.rtf |
| Converters | Any file that must be converted |
| TextFiles | *.txt |
| FilesBeforeVersion | Files created by an application of a version below a set minimum version. |

In embodiments, the block policy is stored within a registry of an operating system such as registry 112 (FIG. 1). The block policy is stored as registry keys within registry 112. For example, in an embodiment, registry 112 will include a registry key for each file type (and associated file formats). An administrator may then set the block policy through the individual registry keys. In some embodiments, a single registry key is used to set a save block policy for a file type, and a second registry key is used to set an open block policy for the same file type.

Referring again to FIG. 2, type inspector module 124 is used to determine a true file format of a file. In some embodiments, type inspector module 124 is code that is part of application 104. As one example, application 104 may include code that sniffs file information to determine whether the file is of a format that can be opened by application 104. In this embodiment, the same code used to determine whether a file is of a format that can be opened by application 104 is also used to determine the true file format for purposes of comparing with block policy 114. In other embodiments, type inspector module 124 is code that is specifically used for determining a true file format of the file for purposes of comparing with block policy 114.

Decision block 200 can process information from type inspector 124 and block policy 114 and determine an action regarding a file. For example, in one embodiment, decision block 200 can process the information from type inspector 124 and open block policy 114A and determine whether application 104 should open a file. As another example, decision block 200 can process information from type inspector 124 and save block policy 114B and determine whether application 104 should save a file.

In one operational mode, application 104 receives a request from a user to open file 202 which is stored in storage 204. Type detector module 124 examines a portion of file data of file 202, before loading file 202 into memory from storage 204. This prevents any malicious code that is within file 202 from being loaded into memory before the true file format of file 202 can be determined.

Once type inspector module 124 examines file data of file 202, and determines its true file format, decision block 200 can retrieve information from open block policy 114A to determine whether the true file format of a file 202 is blocked from being opened. If the true file format of file 202 is blocked, decision block 200 will prevent file 202 from being loaded into memory and display a message to a user indicating that the file is of a format that cannot be opened because it is blocked. If the true file format of file 202 is not blocked, decision block 200 will allow file 202 to be opened by loading file 202 into memory and allowing a user to access the file through application 104.

In another embodiment of the first operational mode, application 104 may open file 202 despite the fact that the true file format of file 202 is blocked from opening by the block policy 114A. In this embodiment, decision block 200 will first consider the location in storage 204 where file 202 is stored. If the location in storage 114 is a trusted location, then decision block 200 will open file 202 regardless of block policy 114A. That is, if the file is being opened from a trusted location, the block policy 114A is bypassed. This embodiment advantageously provides a way of allowing a user to continue working on their trusted documents without compromising security, because the documents are stored in a location where it is unlikely that they have been compromised.

In some embodiments, the trusted location feature is controlled by an administrator who may turn the trusted location feature on or off. As one example, the trusted location feature may be part of application 104's configuration information, which is stored in a registry of an operating system, such as registry 112. An administrator can then change the trusted location feature by changing the configuration information within registry 112. Additionally, in embodiments an administrator may specifically select those locations that are considered to be trusted. This embodiment prevents a situation in which a user may attempt to open a file from a location that it deems as trusted, however an administrator has not determined that the location is unlikely to have been compromised.

Once application 104 has opened a file 202, in a second operational mode application 104 may receive a request from a user to save file 202 via a save operation or a save-as operation. Type detector module 124 determines the file format that the user has requested for saving file 202. Decision block 200 retrieves information from save block policy 114B, and determines whether the file format selected by the user is blocked. If the file format selected by the user is blocked, decision block 200 will display a message to the user indicating that the user has attempted to save a file in a format that is blocked. If the file format selected by the user is not blocked, decision block 200 will save the file in the format selected by the user.

In one embodiment of the second operational mode, block policy 114B is bypassed if the request to save file 202 is received during an automatic save operation. As those of skill in the art will appreciate, some applications have a feature by which they automatically save information after a predetermined period of time. This feature avoids loss of information that may occur if a user has made changes to a file, but has failed to save those changes. In one embodiment, these automatic save operations bypass block policy 114B. Decision block 200 determines whether the save request is part of an automatic save operation. If so, decision block 200 allows file 202 to be saved in any format, including formats that are blocked in the block policy 114B. This embodiment may be implemented as a way of avoiding errors that may occur by interfering with automatic save operations.

FIGS. 3-6 illustrate operational flows 300, 400, 500 and 600, according to embodiments. Operational flows 300, 400, 500 and 600 may be performed in any suitable computing environment. For example, the operational flows may be executed by an application such as application 104 (FIG. 1 and FIG. 2) to open a file. Therefore, the description of operational flows 300, 400, 500 and 600, may refer to at least one of the components of FIG. 1 and FIG. 2. However, any such reference to components of FIG. 1 and FIG. 2 is for descriptive purposes only, and it is to be understood that the implementations of FIG. 1 and FIG. 2 are a non-limiting environment for operational flows 300, 400, 500 and 600.

Furthermore, although operational flows 300, 400, 500 and 600 are illustrated and described sequentially in a particular order, in other embodiments, the operations may be performed in different orders, multiple times, and/or in parallel. Further, one or more operations may be omitted or combined in some embodiments.

Figure 3:
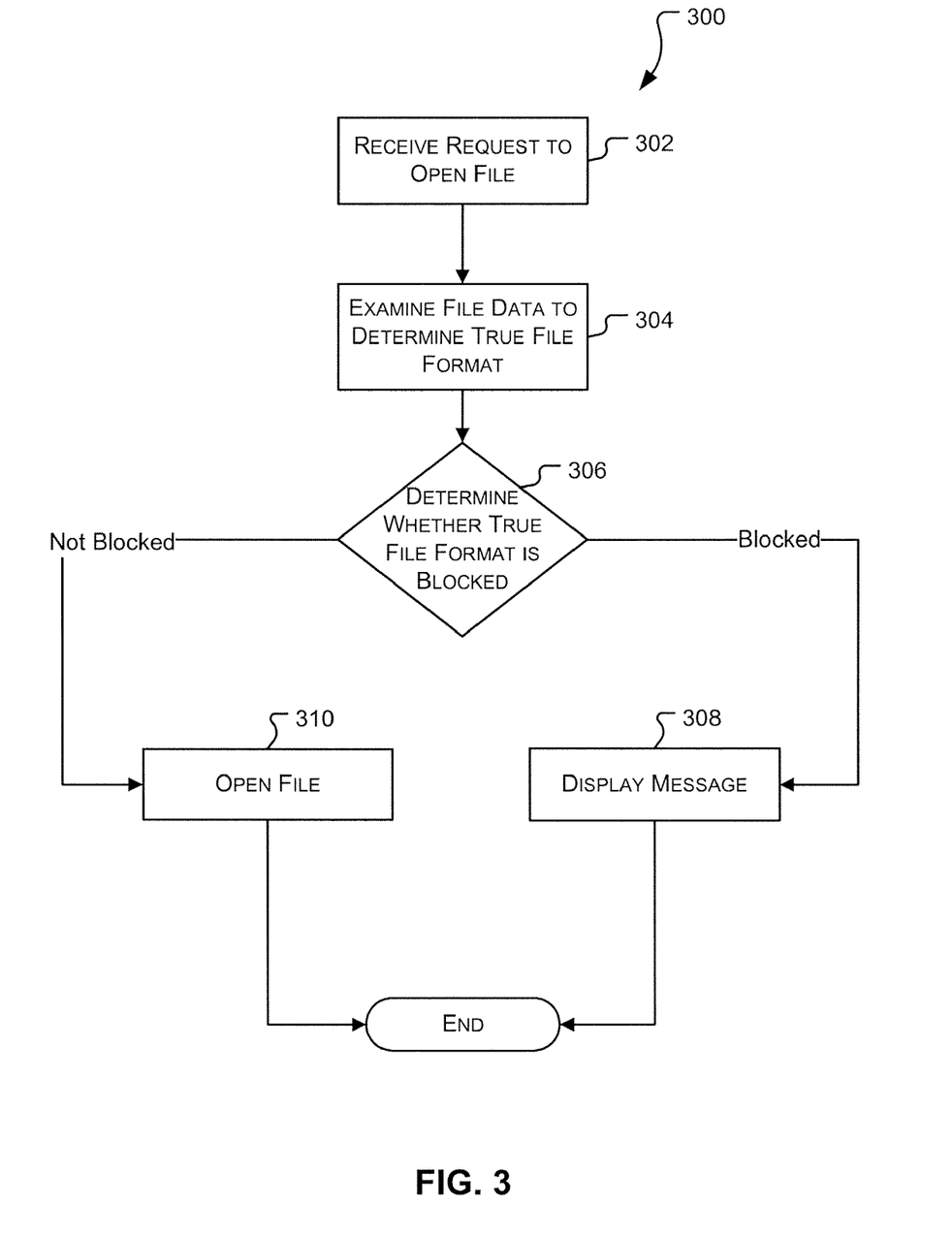
FIG. 3 illustrates an operational flow for blocking the opening of a file.

FIG. 3 illustrates an operational flow 300 for opening a file, according to one embodiment. At operation 302 a request to open a file is received. In one embodiment, the request is received by an application such as application 104 (FIG. 1 and FIG. 2). For example, a user may attempt to open a file by launching an application and then selecting the file. In some embodiments a user selects a file, which may automatically launch appropriate application to open the file (or prompt the user to select an application to open the file).

At operation 304 file data from the file is examined to determine a true file format. In one embodiment, an application having a type inspector module, such as type inspector module 124 (FIG. 1 and FIG. 2), is used to inspect file data before the file is loaded into memory. The file data inspected by the type inspector module is only a small fraction of the data within the file. By identifying features within the data such as header information and data structures, the type inspector module can make a determination as to the true file format without the need to examine all of, or a large part of, the data within the file.

At operation 306 a determination is made as to whether the true file type for the file is blocked from being opened. In embodiments, the determination is made by accessing an open block policy, such as open block policy 114A (FIG. 2), which indicates which file formats have been blocked from opening. If the true file format of the file is blocked from opening, flow passes to operation 308, where a message is displayed indicating that the file has been blocked from opening.

In embodiments, the message displayed at operation 308 is displayed to a user, and provides information to a user regarding the blocking of the file open. For example, the message may indicate to a user that the file is of a particular type (e.g., *.doc) which is blocked from being opened because of a security risk. Also, the message directs a user to contact an administrator if there are any issues. As those of skill in the art will appreciate, the message may provide a user with additional information, such as the specific name and contact information for the administrator.

If at operation 306, a determination is made that the true file format is not blocked then flow passes to operation 310 where the file is opened by loading the file into memory and providing a user access to the file. For example, in one embodiment an application, such as application 104, performs operation 310 by loading the file into memory and providing access to a user through the application, to allow the user to edit, add, and save data in the file.

Figure 4:
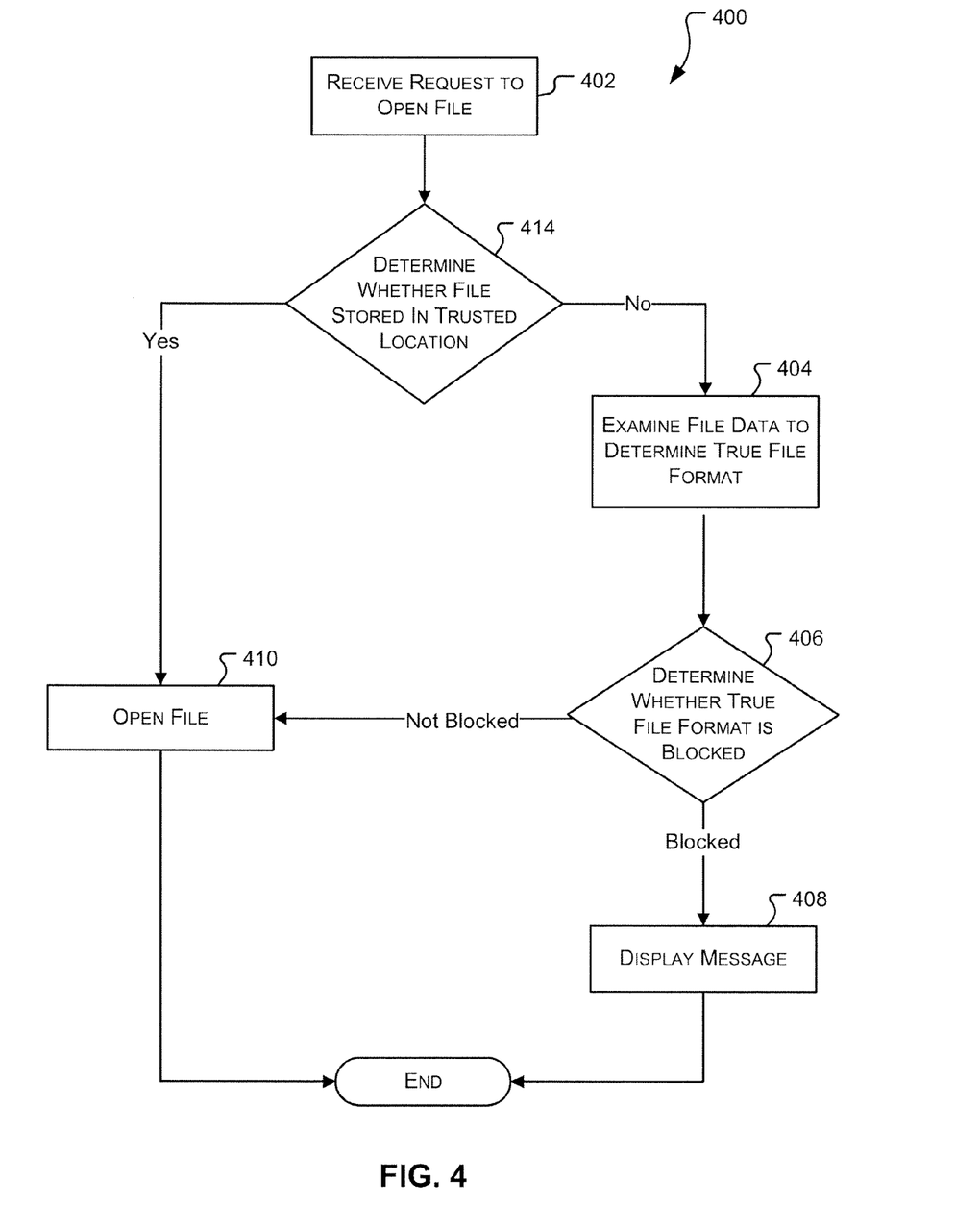
FIG. 4 illustrates a second operational flow for blocking the opening of a file.

FIG. 4 illustrates an operational flow 400 for opening a file, according to another embodiment. At operation 402 a request to open a file is received. Similar to operation 302 (FIG. 3), in embodiments a user may attempt to open a file by launching an application and then selecting the file. While in other embodiments a user may select a file, which may automatically launch an appropriate application to open the file (or prompt the user to select an application to open the file).

After operation 402, flow passes to operation 414 where a determination is made as to whether the file is stored in a trusted location. In one embodiment, an administrator may predetermine specific locations in storage that are considered trusted locations. For example, the trusted locations may have security features that prevent files within the trusted locations from being compromised with malicious code. As a result, files within trusted locations can be opened without applying a block policy, because they are not likely to have been compromised and do not pose a serious security risk.

If at operation 414 it is determined that the file is stored in a trusted location, flow passes to operation 410 where the file is opened by loading the file into memory and providing access to the file for a user. For example, in one embodiment an application, such as application 104 (FIG. 1 and FIG. 2), performs operation 410 by loading the file into memory and providing access to a user for editing, adding, and saving data in the file.

If at operation 414 it is determined that the file is not stored in a trusted location, then there is a greater likelihood that the file has been comprised with malicious code, and flow passes to operation 408, where file data is examined to determine the true file format for the file. In one embodiment, operation 404 is performed by a type inspector module such as type inspector module 124 (FIG. 1 and FIG. 2).

At operation 406 a determination is made as to whether the true file type for the file is blocked from being opened. The determination is made, in some embodiments, by accessing an open block policy, such as open block policy 114A, which indicates which file formats have been blocked from opening. If the true file format of the file is blocked from opening, flow passes to operation 408, where a message is displayed indicating that the file has been blocked from opening. If at operation 406, a determination is made that the true file format is not blocked then flow passes to operation 410 where the file is opened by loading the file into memory and providing a user access to the file.

Figure 5:
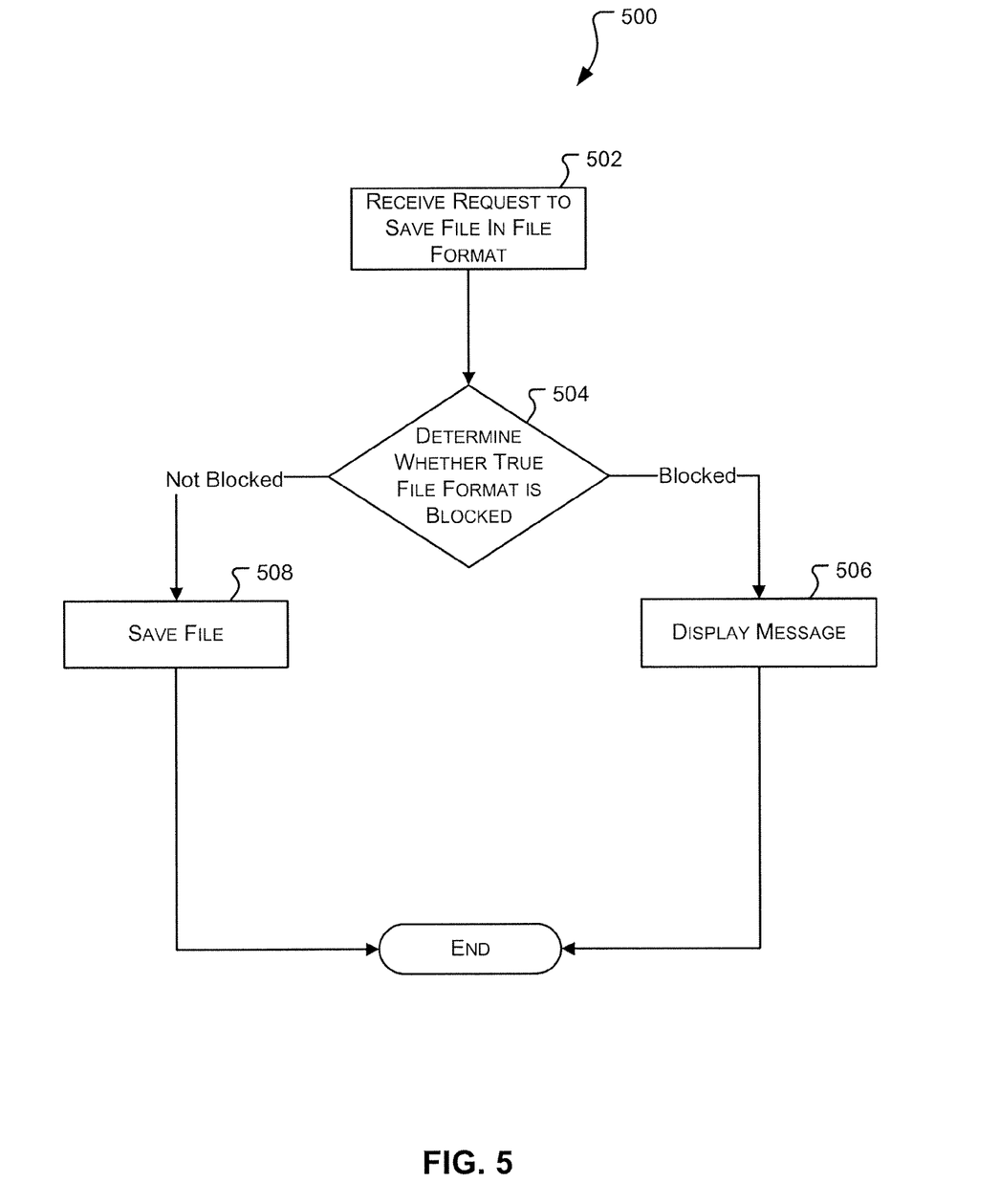
FIG. 5 illustrates an operational flow for blocking the saving of a file.

FIG. 5 illustrates an operational flow 500 for saving a file, according to an embodiment. At operation 502 a request to save a file is received. In embodiments, a user may attempt to save a file that has previously been opened with an application, such as application 104 (FIG. 1 and FIG. 2). In these embodiments, the application will receive the request by the user to save the file. In one embodiment, the application may attempt to save the file using the current file format. In other embodiments, the application provides the user with an option of selecting a particular file format for saving the file.

Flow passes to operation 504, where a determination is made as to whether the file format for saving the file is blocked. In embodiments, the determination is made by accessing a save block policy, such as save block policy 114B (FIG. 2), which indicates which file formats have been blocked from saving. If the true file format of the file is blocked from saving, flow passes to operation 508, where a message is displayed indicating that the file has been blocked from saving.

In embodiments, the message displayed at operation 508 provides information to a user regarding the blocking of the file save. For example, the message may indicate to a user that the file is of a particular type (e.g., *.doc) which is blocked from being saved because of a security risk. The message may provide a user with additional information such as a suggestion to save the file in a different format.

If at operation 506, a determination is made that the true file format is not blocked from saving then flow passes to operation 610 where the file is saved. For example, in one embodiment an application, such as application 104, which previously opened the file will save the file and any changes made to the file since it was last saved. The file is saved in the requested file format.

Figure 6:
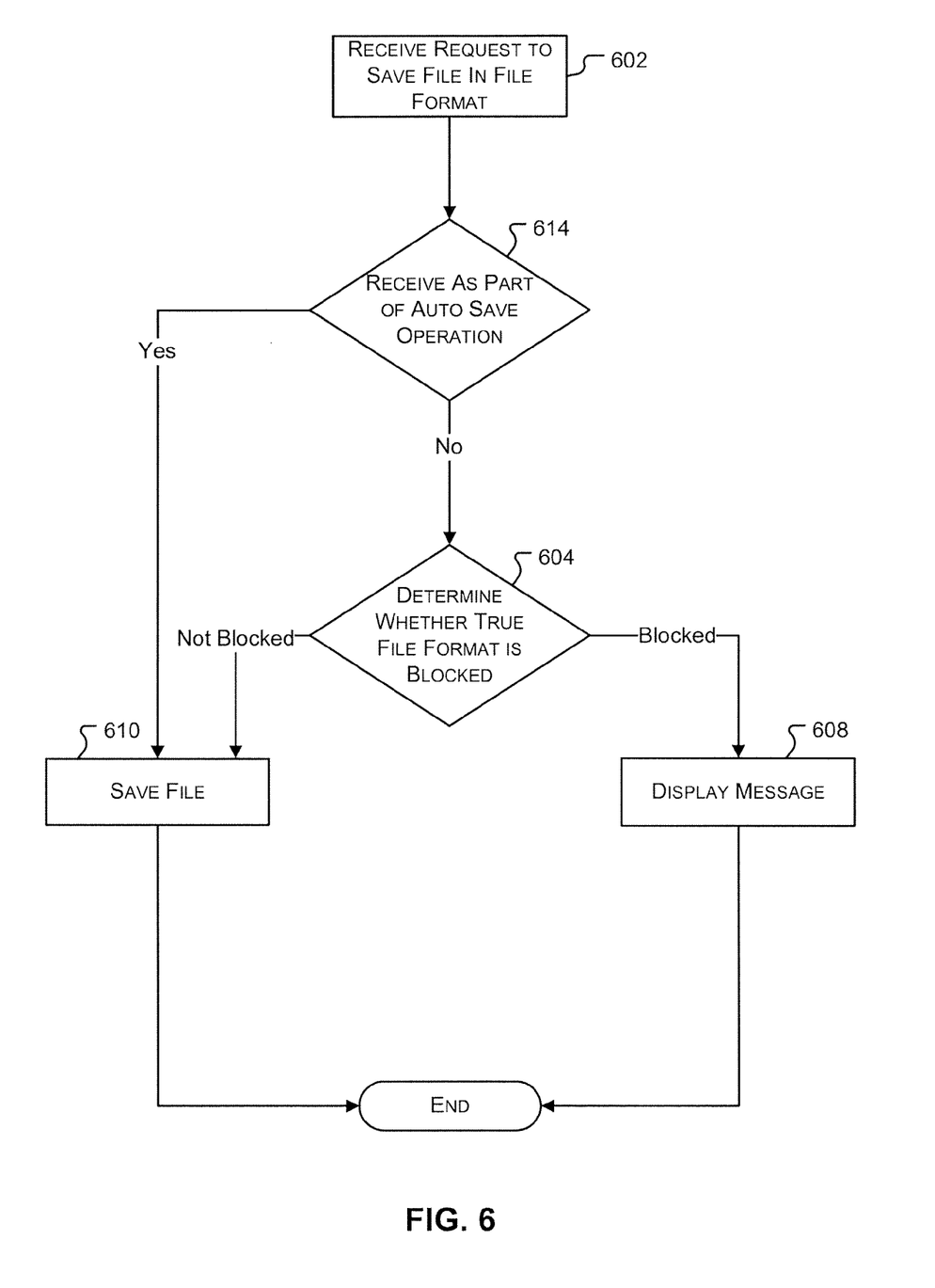
FIG. 6 illustrates a second operational flow for blocking the saving of a file.

FIG. 6 illustrates an operational flow 600 for saving a file, according to another embodiment. At operation 602 a request to save a file is received. In embodiments, a user may attempt to save a file that has previously been opened with an application, such as application 104 (FIG. 1 and FIG. 2). In these embodiments, the application will receive the request by the user to save the file. The application may attempt to save the file using the current file format. In other embodiments, the application provides the user with an option of selecting a particular file format for saving the file.

Flow passes to operation 614 where a determination is made as to whether the request is part of an auto save operation. In an embodiment, an application may provide for an auto save operation where a file is automatically saved periodically. Applying a block policy may interfere with the auto save feature of the application. Accordingly, operation 614 determines whether the block policy will be applied.

If operation 614 determines that the request is part of an auto save operation, flow passes to operation 610, where the file is saved. In embodiments, the file is saved in the file's current file format. However, a file may be saved in some default file format established for the application.

If operation 614 determines that the request is not part of an auto save operation, flow then passes to operation 604, where a determination is made as to whether the file format for saving the file is blocked. In embodiments, the determination is made by accessing a save block policy, such as save block policy 114B (FIG. 2), which indicates which file formats have been blocked from saving. If the true file format of the file is blocked from saving, flow passes to operation 608, where a message is displayed indicating that the file has been blocked from saving. The message may provide information to a user, such as an indication of the file format that is blocked and/or a suggestion to save the file in a different format.

If at operation 604, a determination is made that the true file format is not blocked from saving, then flow passes to operation 610 where the file is saved. For example, in one embodiment an application, such as application 104, which previously opened the file will save the file and any changes made to the file since it was last saved. The file is saved in the requested file format.

Figure 7:
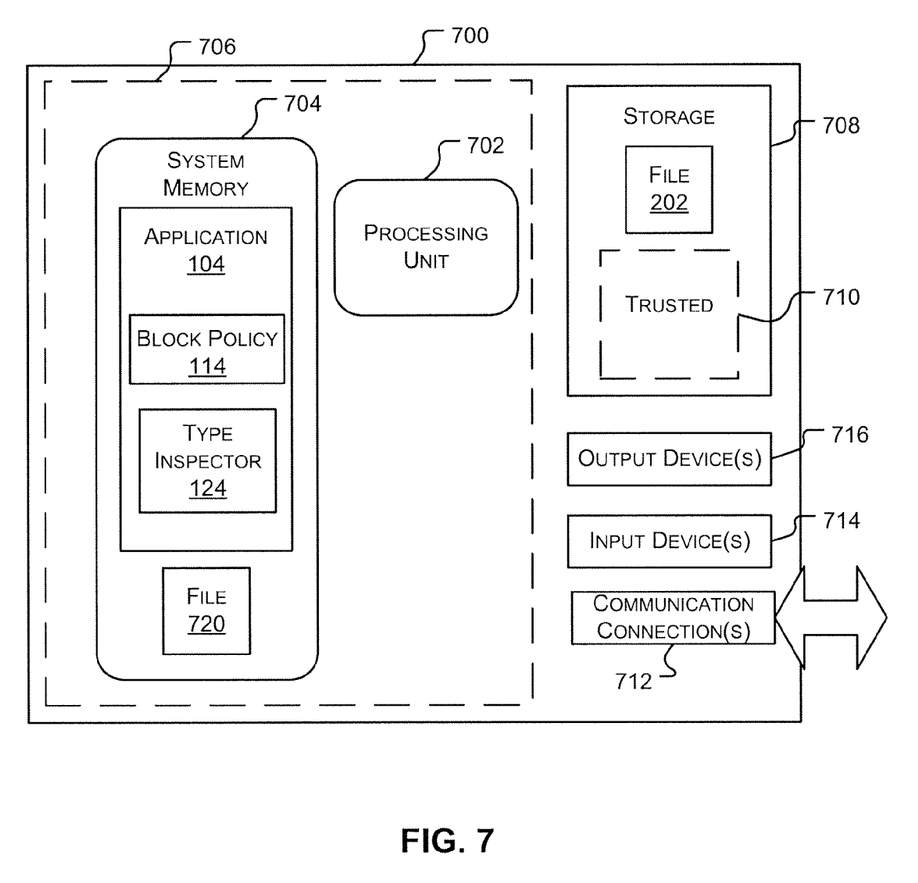
FIG. 7 illustrates a block diagram of a computing environment suitable for implementing embodiments.

FIG. 7 illustrates a general computer environment 700, which can be used to implement the embodiments described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the example computer environment 700.

In its most basic configuration, system 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. As shown in FIG. 7, applications, such as application 104 (FIG. 1 and FIG. 2), including block policy 114 and type inspector module 124 may be loaded into system memory 704 for use by a user of device 700. FIG. 7 also shows file 720 which is loaded into system memory by application 104 using, for example, the flow processes 300 or 400 (FIG. 3 and FIG. 4) described above.

Additionally, system 700 may also have additional features/functionality. For example, device 700 may also include additional storage 708 (removable and/or non-removable) including, but not limited to, magnetic or optical disks or tape. Such additional storage is illustrated in FIG. 7 by storage 708. Computer storage media includes volatile and nonvolatile, removable and non-removable media implemented in any method or technology for storage of information such as computer readable instructions, data structures, program modules or other data. Memory 704 and storage 708 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 700. Any such computer storage media may be part of system 700.

In some embodiments, storage 708 may include locations that are designated as trusted locations, such as location 710. As is described above in relation to flow process 400 (FIG. 4), location 710 may have additional security protections that make files stored within location 710 less likely to have been compromised by a malicious user. Trusted location 710 may be within removable or non-removable storage.

System 700 may also contain communications connection (s) 712 that allow the system to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 700 may also have input device(s) 714 such as keyboard, mouse, pen, voice input device, touch input device, etc. Output device(s) 716 such as a display, speakers, printer, etc. may also be included. All these devices are well know in the art and need not be discussed at length here.

Reference has been made throughout this specification to "one embodiment" or "an embodiment," meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method of blocking the opening of a file, the method comprising:
    configuring at least one processor to perform the steps of:
    receiving a request to open a file;
    examining a portion of the file's data to determine a true file format for the file;
    determining whether the true file format is of a format that is blocked from being opened, wherein an open block policy is stored in a registry and a registry key is used to set the open block policy for a file to prevent an application from opening a file of a specific file type and associated format;
    based on the determining, blocking the opening of the file by preventing the loading of the file into memory and preventing access to the file; and
    displaying a message indicating that the file has been blocked from opening.

2. The method of claim 1, wherein the examining, determining, blocking, and displaying is performed by an application that is capable of opening the file by loading the file into memory and providing access to the file.

3. The method of claim 1, wherein a file extension is not used to determine the true file format.

4. The method of claim 3, wherein the examining comprises identifying features within the portion of the file's data that indicate the true file format.

5. The method of claim 4, wherein the features include header information and data structures.

6. The method of claim 1, wherein the determining comprises accessing an open block policy indicating a file type that is blocked from being opened, the true file format being associated with the file type.

7. The method of claim 1, further comprising after the receiving, determining whether the file is stored in a trusted location.

8. The method of claim 7, wherein in response to a determination that the file is stored in a trusted location:
    bypassing the examining, determining, blocking, and displaying steps; and
    opening the file by loading the file into memory and allowing access to the file.

9. The computer readable storage medium of claim 8, wherein the determining comprises accessing an open block policy indicating a file type that is blocked from being opened, the true file format being associated with the file type.

10. The computer readable storage medium of claim 9, wherein the trusted location is designated by an administrator in a registry key within the registry.

11. A computer readable storage medium encoding instructions, wherein the computer readable storage media does not consist of a propagated data signal, wherein when the encoded instructions are executed by a processor, results in a machine performing the functions of:
    receiving by an application a request to open a file;
    determining whether the file is stored in a trusted location;
    in response to a determination that the file is stored in a trusted location, the application opening the file by loading the file into memory and allowing access to the file; and
    in response to a determination that the file is not stored in a trusted location:
    examining a portion of the file's data to determine a true file format for the file;
    determining whether the true file format is of a format that is blocked from being opened, wherein an open block policy is stored in a registry and a registry key is used to set the open block policy for a file to prevent an application from opening a file of a specific file type and associated format;
    in response to the file not being of a type that is blocked from being opened, the application opening the file by loading the file into memory and allowing access to the file; and
    in response to the file being of a type that is blocked from being opened, displaying a message indicating that the file has been blocked from opening.

12. The computer readable storage medium of claim 11, wherein a file extension is not used to determine the true file format.

13. The computer readable storage medium of claim 12, wherein the examining comprises identifying features within the portion of the file's data that indicate the true file format.

14. The computer readable storage medium of claim 13, wherein the features include header information and data structures.

15. A method of blocking the saving of a file, the method comprising:
    configuring at least one processor to perform the steps of:
    receiving a request to save a file as a true file format;
    examining a portion of the file's data to determine a true file format for the file;
    determining whether the true file format is of a format that is blocked from being saved, wherein a save block policy is stored in a registry and a registry key is used to set the save block policy for a file to prevent an application from saving a file of a specific file type and associated format;

based on the determining, blocking the saving of the file; and displaying a message indicating that the file has been blocked from saving.

16. The method of claim 15, wherein if the request is received as part of an auto save operation:

bypassing the determining, blocking, and displaying steps; and saving the file in the true file format; and if the request is not received as part of an auto save operation, performing the determining, blocking, and displaying steps.

17. The method of claim 15, wherein the determining comprises accessing a save block policy indicating a file type that is blocked from being saved, the true file format being associated with the file type.

* * * * *